(12) United States Patent
Nakanishi et al.

(10) Patent No.: US 12,439,538 B2
(45) Date of Patent: Oct. 7, 2025

(54) ELECTRONIC DEVICE

(71) Applicant: Mitsubishi Electric Corporation, Tokyo (JP)

(72) Inventors: Yu Nakanishi, Tokyo (JP); Daiki Harada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/880,298

(22) PCT Filed: Jul. 20, 2022

(86) PCT No.: PCT/JP2022/028176
§ 371 (c)(1),
(2) Date: Dec. 31, 2024

(87) PCT Pub. No.: WO2024/018557
PCT Pub. Date: Jan. 25, 2024

(65) Prior Publication Data
US 2025/0261322 A1    Aug. 14, 2025

(51) Int. Cl.
*H05K 5/02* (2006.01)
*H05K 7/20* (2006.01)

(52) U.S. Cl.
CPC ......... *H05K 5/0286* (2013.01); *H05K 7/2039* (2013.01)

(58) Field of Classification Search
CPC . G06F 1/203; G06F 1/20; G06F 1/206; G06F 11/3037; G06F 2200/201; G06F 11/3058; G11B 33/144; H05K 5/0269; H05K 5/0286; H05K 5/0295; H05K 7/2039
See application file for complete search history.

(56) References Cited

U.S. PATENT DOCUMENTS

| | | | | |
|---|---|---|---|---|
| 5,373,149 A | * | 12/1994 | Rasmussen | H05K 5/0269 |
| | | | | 235/487 |
| 6,278,609 B1 | * | 8/2001 | Suzuki | G06F 1/203 |
| | | | | 361/720 |
| 7,518,870 B2 | * | 4/2009 | Choi | H05K 5/0265 |
| | | | | 439/159 |
| 2002/0163472 A1 | * | 11/2002 | Kasuya | H01Q 1/2275 |
| | | | | 343/702 |

(Continued)

FOREIGN PATENT DOCUMENTS

| | | |
|---|---|---|
| JP | H05-259667 A | 10/1993 |
| JP | 2004-013685 A | 1/2004 |

(Continued)

OTHER PUBLICATIONS

Ishizaka et al. JP 2019175966; Heat Radiation Structure of Heating Member. PE2E search translation. (Year: 2019).*

(Continued)

*Primary Examiner* — Michael A Matey
(74) *Attorney, Agent, or Firm* — XSENSUS LLP (57) ABSTRACT

An electronic device includes a card slot, a heat transferrer, a printed wiring board connected to the heat transferrer to allow heat transfer from the heat transferrer, and a contact switch that switches between a contact state and a non-contact state of the card slot and the heat transferrer.

6 Claims, 7 Drawing Sheets

(56) References Cited

U.S. PATENT DOCUMENTS

| | | | | |
|---|---|---|---|---|
| 2006/0023410 A1* | 2/2006 | Solomon | ............... | G06F 1/1632 |
| | | | | 361/679.4 |
| 2008/0017719 A1* | 1/2008 | Kanagawa | ........... | H01Q 1/2275 |
| | | | | 235/492 |
| 2008/0247138 A1 | 10/2008 | Suzuki | | |
| 2010/0022113 A1* | 1/2010 | Ito | ........................ | H01R 13/633 |
| | | | | 439/325 |
| 2011/0193617 A1* | 8/2011 | Yoshimoto | ........... | G06K 7/0021 |
| | | | | 327/518 |
| 2017/0368365 A1* | 12/2017 | Eckert | ....................... | A61N 1/06 |
| 2020/0225719 A1* | 7/2020 | Scott, III | ............ | G06F 11/3037 |

FOREIGN PATENT DOCUMENTS

| | | | |
|---|---|---|---|
| JP | 2008-257585 A | 10/2008 | |
| JP | 2008-258392 A | 10/2008 | |
| JP | 2009-193350 A | 8/2009 | |
| JP | 2014-165303 A | 9/2014 | |
| JP | 2016-164911 A | 9/2016 | |
| WO | 2010/092994 A1 | 8/2010 | |

OTHER PUBLICATIONS

International Search Report and Written Opinion mailed on Oct. 11, 2022, received for PCT Application PCT/JP2022/028176, filed on Jul. 20, 2022, 11 pages including English Translation.

Decision to Grant mailed on Apr. 18, 2023, received for JP Application 2023-517254, 5 pages including English Translation.

* cited by examiner

ELECTRONIC DEVICE

CROSS-REFERENCE TO RELATED APPLICATION

This application is a national stage application, pursuant to 35 U.S.C. § 371, of International Patent Application No. PCT/JP2022/028176, filed Jul. 20, 2022, the entire contents of which are incorporated herein by reference.

TECHNICAL FIELD

The present disclosure relates to an electronic device.

BACKGROUND ART

When a memory card is inserted in a card slot and accessed, the memory card generates heat. The memory card may generate excess heat that can possibly cause, for example, an erroneous operation or a failure. An electronic device including a card slot is thus to be designed to dissipate heat generated from the memory card.

A technique associated with this issue is an electronic device in Patent Literature 1 described below. The electronic device described in Patent Literature 1 includes, on a card, a heat transferrer that deforms to come in contact with a heat receiving portion of a heat dissipator in the electronic device to prevent overheating of the card.

CITATION LIST

Patent Literature

Patent Literature 1: Unexamined Japanese Patent Application Publication No. 2008-258392

SUMMARY OF INVENTION

Technical Problem

In the electronic device described in Patent Literature 1, the heat transferrer deforms and comes in contact with the heat receiving portion each time power is supplied to the electronic device. Thus, heat flows back from the heat dissipator to the card when the temperature of the heat dissipator is higher than the temperature of the card. The heat dissipator is usually used to dissipate heat generated by multiple circuits. Thus, the temperature of the heat dissipator is likely to be higher than the temperature of the card.

Under such circumstances, an objective of the present disclosure is to provide an electronic device that prevents heat backflow to the card.

Solution to Problem

To achieve the above objective, an electronic device according to an aspect of the present disclosure includes a card slot, a heat transferrer, a heat dissipator connected to the heat transferrer to allow heat transfer from the heat transferrer, and contact switching means for switching between a contact state and a non-contact state of the card slot and the heat transferrer.

Advantageous Effects of Invention

The electronic device according to the above aspect of the present disclosure prevents heat backflow to the card.

DESCRIPTION OF EMBODIMENTS

An electronic device according to one or more embodiments of the present disclosure is described with reference to the drawings. Like reference signs denote like or corresponding components in the drawings.

Embodiment 1

An electronic device 1 according to Embodiment 1 is described with reference to FIGS. 1 and 2. The electronic device 1 can access a memory card 11. The electronic device 1 includes a card slot 10, a heat transferrer 20, a printed wiring board 30, and a contact switch 40. The electronic device 1 also includes various electronic components (not illustrated). The electronic device 1 is an example of an electronic device in an aspect of the present disclosure.

Figure 1:
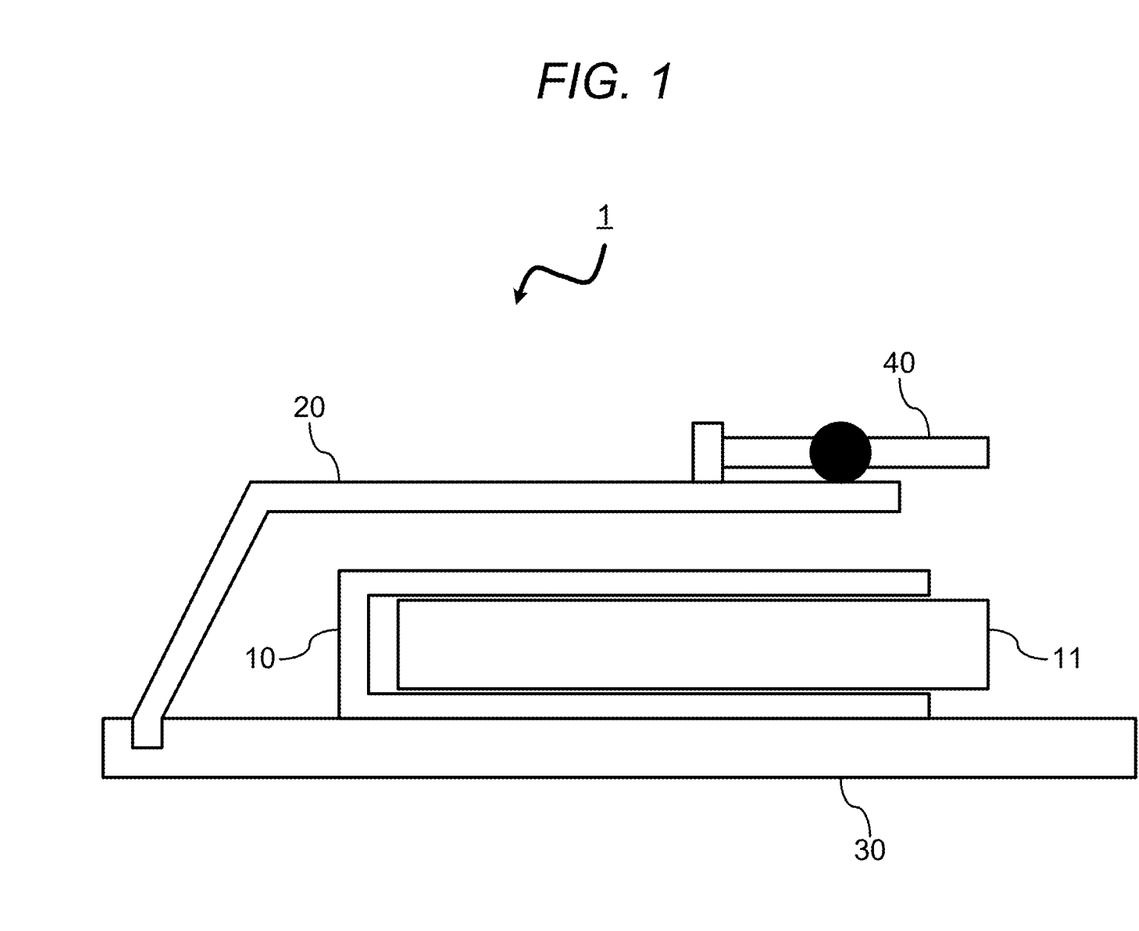
FIG. 1 is a schematic diagram of an electronic device according to Embodiment 1 of the present disclosure.
Figure 2:
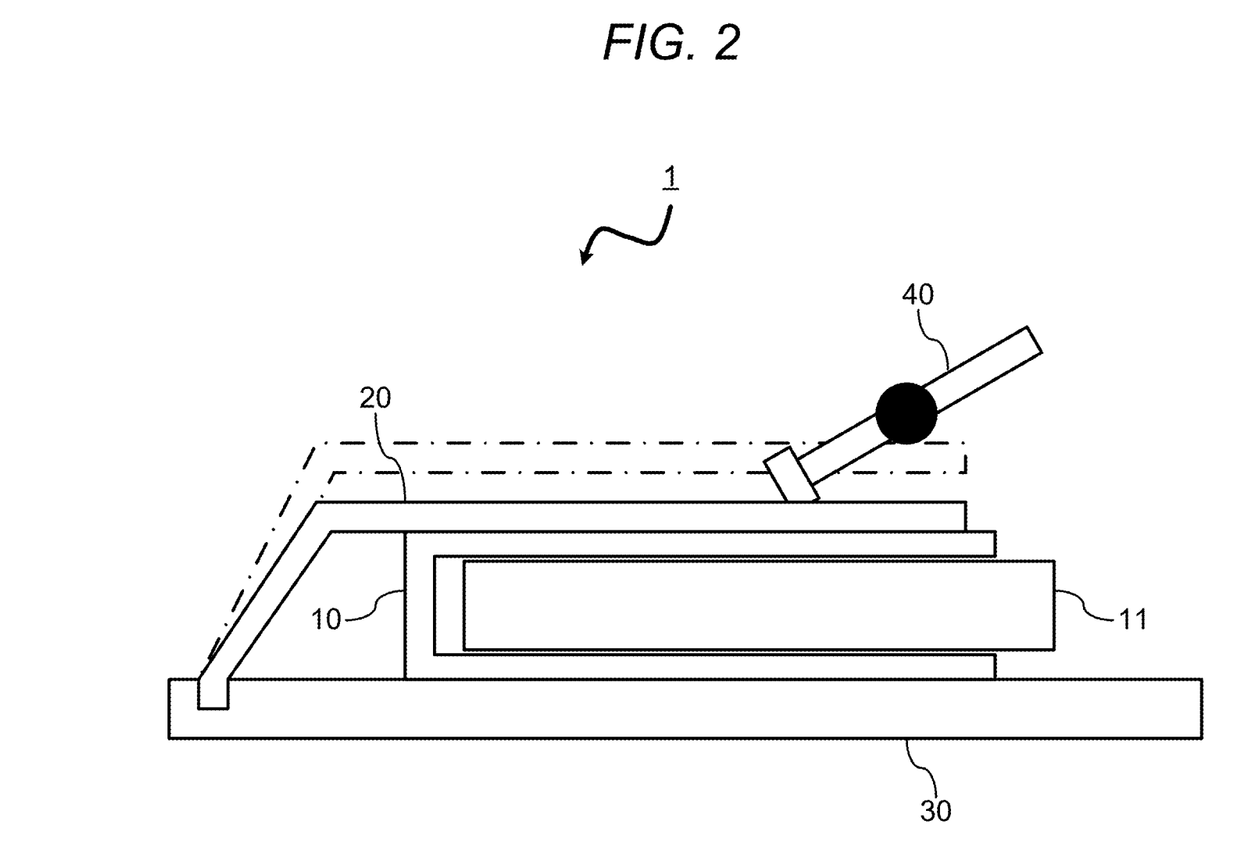
FIG. 2 is a diagram of a contact switch that is switched on in the electronic device according to Embodiment 1 of the present disclosure.

In the state illustrated in FIG. 1, the card slot 10 and the heat transferrer 20 are not in contact with each other. As described in detail later, when a user operates the contact switch 40, the heat transferrer 20 deforms and comes in contact with the card slot 10 as illustrated in FIG. 2. The dot-dash line illustrated in FIG. 2 indicates the heat transferrer 20 before deformation. This allows heat in the card slot 10 to be dissipated to the printed wiring board 30 through the heat transferrer 20.

The components of the electronic device 1 are described. The card slot 10 is used for access to the memory card 11. The memory card 11 is placed in the card slot 10 to allow the card slot 10 to access the memory card 11. The card slot 10 is an example of a card slot in an aspect of the present disclosure.

The heat transferrer 20 is connected to the printed wiring board 30 to dissipate heat to the printed wiring board 30. When the heat transferrer 20 comes in contact with the card slot 10 with operation on the contact switch 40 (described later), the heat transferrer 20 can dissipate heat generated in the card slot 10 to the printed wiring board 30. The heat transferrer 20 is, for example, a tough metal plate. As illustrated in FIG. 2, when the contact switch 40 presses down the heat transferrer 20, the heat transferrer 20 deforms with the toughness to come in contact with the card slot 10. The heat transferrer 20 is an example of a heat transferrer in an aspect of the present disclosure.

The printed wiring board 30 electrically connects various electronic components (not illustrated) of the electronic device 1 to the card slot 11. The printed wiring board 30 is connected to the heat transferrer 20 to allow heat dissipation from the heat transferrer 20. The printed wiring board 30 connected to the heat transferrer 20 to allow heat dissipation from the heat transferrer 20 functions as a heat dissipator for dissipating heat transferred from the heat transferrer 20. The printed wiring board 30 also dissipates heat generated by the various electronic components (not illustrated). The printed wiring board 30 is an example of a heat dissipator in an aspect of the present disclosure.

The contact switch 40 is switched on and off with a user operation. In the state illustrated in FIG. 1, the contact switch 40 is off. In the state illustrated in FIG. 2, the contact switch 40 is on. When the contact switch 40 is off, the card slot 10 and the heat transferrer 20 are not in contact with each other as illustrated in FIG. 1. When the user switches on the contact switch 40 in the off-state, the tip of the contact switch 40 is pressed against the heat transferrer 20 as illustrated in FIG. 2. The heat transferrer 20 thus comes in contact with the card slot 10. When the user switches off the contact switch 40 in the on-state, the card slot 10 and the heat transferrer 20 are out of contact with each other as illustrated in FIG. 1. The contact switch 40 is an example of contact switching means in an aspect of the present disclosure.

A process for preventing heat backflow from the printed wiring board 30 to the memory card 11 is described. As described above, the electronic device 1 includes various electronic components (not illustrated). Such electronic components generate heat. The generated heat is transferred to the printed wiring board 30. When the card slot 10 and the heat transferrer 20 are in contact with each other and the temperature of the card slot 10 is lower than the temperature of the printed wiring board 30, the heat of the printed wiring board 30 is transferred to the memory card 11 through the heat transferrer 20 and the card slot 10. In other words, the heat flows back from the printed wiring board 30 to the memory card 11. Thus, when the card slot 10 and the heat transferrer 20 are in contact with each other, heat may flow back from the printed wiring board 30 to the memory card 11.

When heat can possibly flow back from the printed wiring board 30 to the memory card 11, the user operates the contact switch 40 to be off to place the card slot 10 and the heat transferrer 20 out of contact with each other, thus preventing heat backflow from the printed wiring board 30 to the memory card 11.

When, for example, the memory card 11 is not accessed frequently and the processing load of a processor (not illustrated) included in the electronic device 1 is high, the memory card 11 expectedly generates less heat and the processor expectedly generates more heat. In this case, the temperature of the printed wiring board 30 is expected to be higher than the temperature of the card slot 10 with heat generated by the processor. In this state, heat can flow back to the memory card 11 when the card slot 10 and the heat transferrer 20 are in contact with each other. The user can switch off the contact switch 40 to place the card slot 10 and the heat transferrer 20 out of contact with each other, thus preventing heat backflow.

In contrast, with no possibility of heat backflow from the printed wiring board 30 to the memory card 11, the user switches on the contact switch 40 to place the card slot 10 and the heat transferrer 20 in contact with each other to dissipate heat from the memory card 11 to the printed wiring board 30.

The electronic device 1 according to Embodiment 1 has been described. The electronic device 1 according to Embodiment 1 allows the user to operate the contact switch 40 to switch between the contact state and the non-contact state of the card slot 10 and the heat transferrer 20. Thus, when heat can possibly flow back from the printed wiring board 30 to the memory card 11, the user switches off the contact switch 40 to place the card slot 10 and the heat transferrer 20 out of contact with each other, thus preventing heat backflow.

Embodiment 2

Figure 3:
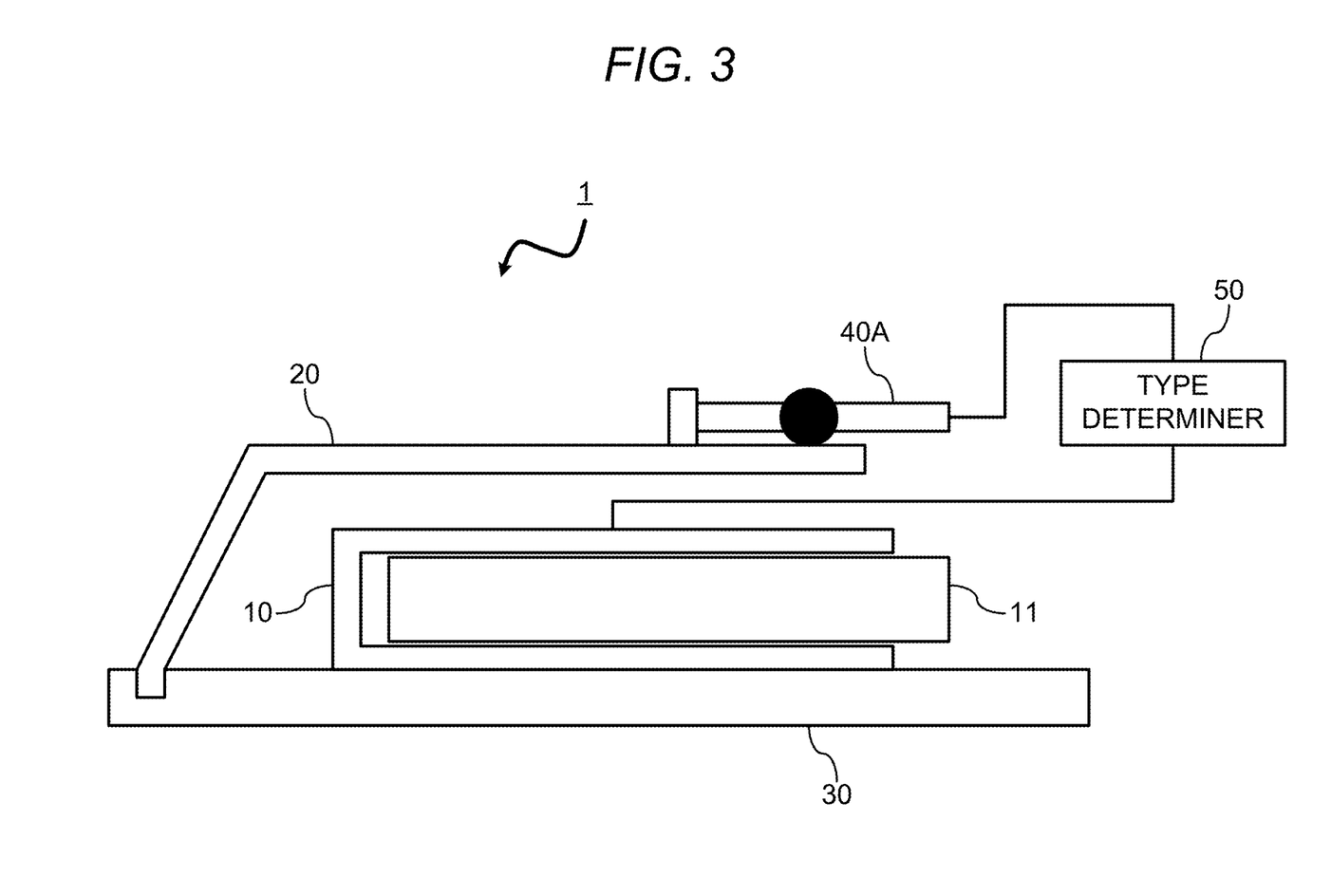
FIG. 3 is a schematic diagram of an electronic device according to Embodiment 2 of the present disclosure.

An electronic device 1 according to Embodiment 2 is now described with reference to FIG. 3. The electronic device 1 according to Embodiment 2 is substantially similar to the electronic device 1 according to Embodiment 1 illustrated in FIG. 1. The electronic device 1 according to Embodiment 2 differs from the electronic device 1 according to Embodiment 1 in further including a type determiner 50 and including a contact switch 40A in place of the contact switch 40.

The type determiner 50 is connected to the card slot 10 and the contact switch 40A to communicate with the card slot 10 and the contact switch 40A. The type determiner 50 communicates with the card slot 10 to determine the type of memory card 11 placed in the card slot 10. The type determiner 50 transmits a signal indicating the determined type of memory card 11 to the contact switch 40A. The type determiner 50 is implemented with, for example, an electronic circuit. The type determiner 50 is an example of type determination means in an aspect of the present disclosure.

The type of memory card 11 refers to, for example, the type of transmission speed of the standard supported by the memory card 11. When, for example, the memory card 11 is a Secure Digital (SD) memory card, the type of memory card 11 is associated with the maximum transmission speed of the SD memory card, such as Default Speed (DS), High Speed (HS), Ultra High Speed (UHS)-I, UHS-II, and UHS-III.

The contact switch 40A is substantially similar to the contact switch 40 in Embodiment 1, except that the contact switch 40A is not operable by the user, but is switched on and off based on a signal. The contact switch 40A is switched on and off based on a signal indicating the type of memory card 11 and received from the type determiner 50. The contact switch 40A thus switches between the contact state and the non-contact state of the card slot 10 and the heat transferrer 20 based on the type of memory card 11. The contact switch 40A is implemented with, for example, an electronic component including an electronic circuit and a mechanical relay. The contact switch 40A is an example of the contact switching means in an aspect of the present disclosure.

For example, the contact switch 40A is switched on when the transmission speed of the memory card 11 determined based on the type of memory card 11 is greater than or equal to a predetermined threshold, placing the card slot 10 and the heat transferrer 20 in contact with each other. The contact switch 40A is switched off when the transmission speed is not greater than the predetermined threshold, placing the card slot 10 and the heat transferrer 20 out of contact with each other. The memory card 11 typically generates more heat at a higher transmission speed. Thus, when the transmission speed of the memory card 11 is greater than or equal to the threshold, the temperature of the card slot 10 that receives heat from the memory card 11 is expected to be higher than the temperature of the printed wiring board 30. In this state, heat has no possibility of flowing back from the printed wiring board 30 to the memory card 11. The contact switch 40A is thus switched on to allow heat from the memory card 11 to be dissipated to the printed wiring board 30 through the card slot 11 and the heat transferrer 20.

In contrast, when the transmission speed of the memory card 11 is less than the threshold, the temperature of the card slot 10 that receives heat from the memory card 11 may be lower than the temperature of the printed wiring board 30. In this state, heat may flow back from the printed wiring board 30 to the memory card 11. The contact switch 40A is thus switched off to prevent heat backflow to the memory card 11.

The electronic device 1 according to Embodiment 2 has been described. The electronic device 1 according to Embodiment 2 allows the contact switch 40A to be automatically switched on and off based on the type of memory card 11 placed in the card slot 10. Unlike in Embodiment 1, this structure prevents heat backflow to the memory card 11 without a user operation.

Embodiment 3

Figure 4:
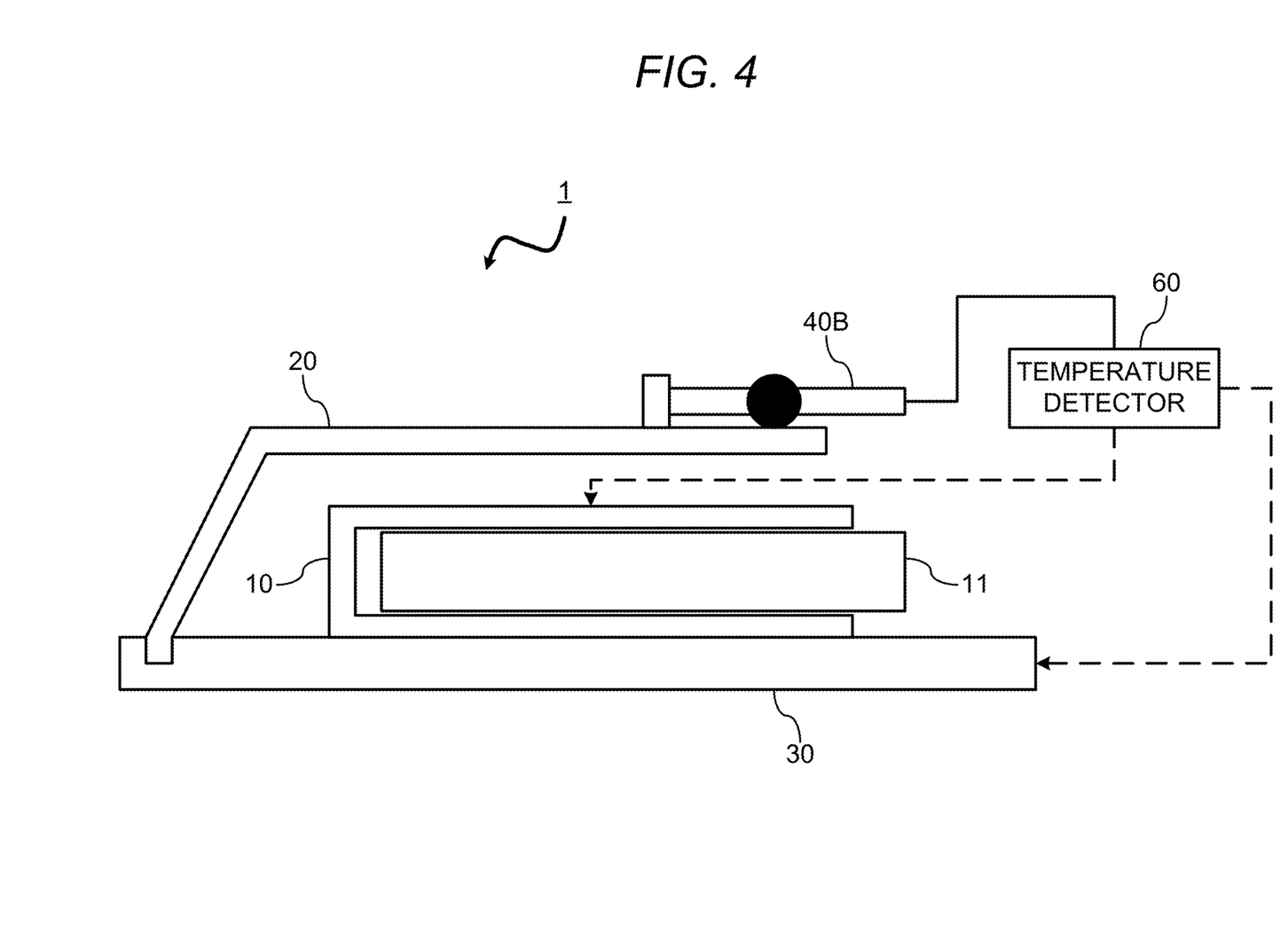
FIG. 4 is a schematic diagram of an electronic device according to Embodiment 3 of the present disclosure.

An electronic device 1 according to Embodiment 3 is described with reference to FIG. 4. The electronic device 1 according to Embodiment 3 is substantially similar to the electronic device 1 according to Embodiment 1 illustrated in FIG. 1. The electronic device 1 according to Embodiment 3 differs from the electronic device 1 according to Embodiment 1 in further including a temperature detector 60 and including a contact switch 40B in place of the contact switch 40.

The temperature detector 60 detects the temperature of the card slot 10 and the temperature of the printed wiring board 30. The dashed arrows illustrated in FIG. 4 indicate that the temperature detector 60 detects the temperatures of the card slot 10 and the printed wiring board 30. The temperature detector 60 is connected to the contact switch 40B to communicate with the contact switch 40B. The temperature detector 60 transmits a signal indicating the temperature of the card slot 10 and a signal indicating the temperature of the printed wiring board 30 to the contact switch 40B. The temperature detector 60 is an example of temperature detection means in an aspect of the present disclosure.

The contact switch 40B is substantially similar to the contact switch 40 in Embodiment 1, except that the contact switch 40B is not operable by the user, but is switched on and off based on a signal. The contact switch 40B is switched on and off based on a signal indicating the temperature of the card slot 10 and a signal indicating the temperature of the printed wiring board 30 received from the temperature detector 60. More specifically, the contact switch 40B is switched on when the temperature of the card slot 10 is higher than the temperature of the printed wiring board 30 and is switched off when the temperature of the card slot 10 is lower than or equal to the temperature of the printed wiring board 30. The contact switch 40B is implemented with, for example, an electronic component including an electronic circuit and a mechanical relay. The contact switch 40B is an example of the contact switching means in an aspect of the present disclosure.

As described above, when the temperature of the card slot 10 is lower than or equal to the temperature of the printed wiring board 30, the contact switch 40B is switched off to prevent heat backflow from the printed wiring board 30 to the memory card 11. When the temperature of the card slot 10 is higher than the temperature of the printed wiring board 30, the contact switch 40B is switched on to dissipate heat from the memory card 11 to the printed wiring board 30.

The electronic device 1 according to Embodiment 3 has been described. The electronic device 1 according to Embodiment 3 allows the contact switch 40B to be switched on and off based on whether the temperature of the card slot 10 is higher or lower than the temperature of the printed wiring board 30, and thus prevents heat backflow to the memory card 11 without a user operation, unlike in Embodiment 1. The contact switch 40B is switched on and off based on whether the temperature of the card slot 10 is higher or lower than the temperature of the printed wiring board 30, thus more reliably preventing heat backflow to the memory card 11 than in Embodiment 2.

Embodiment 4

Figure 5:
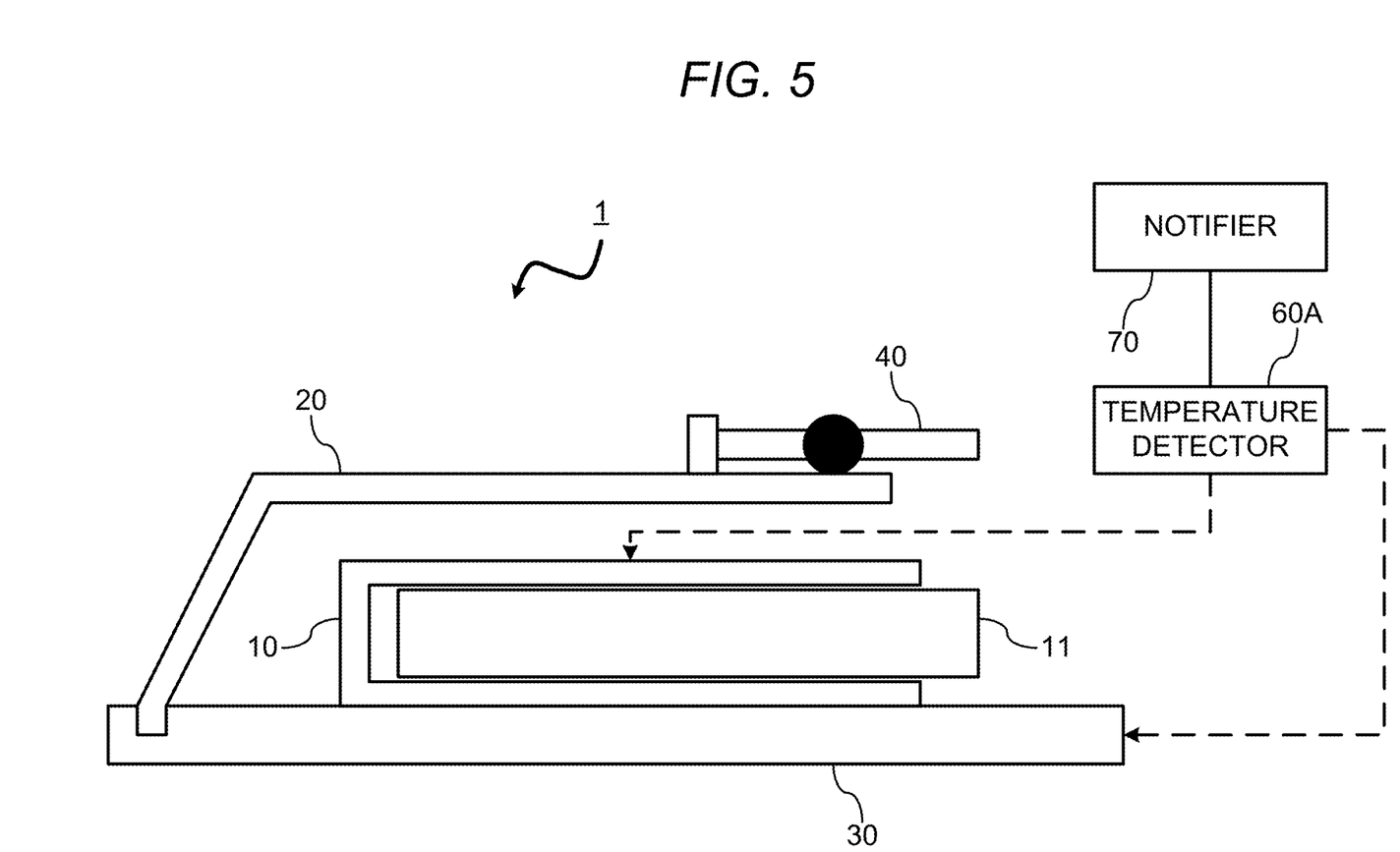
FIG. 5 is a schematic diagram of an electronic device according to Embodiment 4 of the present disclosure.

An electronic device 1 according to Embodiment 4 is now described with reference to FIG. 5. The electronic device 1 according to Embodiment 4 is substantially similar to the electronic device 1 according to Embodiment 1 illustrated in FIG. 1. The electronic device 1 according to Embodiment 4 differs from the electronic device 1 according to Embodiment 1 in further including a temperature detector 60A and a notifier 70. Unlike in Embodiments 2 and 3 described above, the contact switch 40 is the same as in Embodiment 1. More specifically, the contact switch 40 is switched on and off by a user operation.

The temperature detector 60A is substantially similar to the temperature detector 60 in Embodiment 3, but differs from the temperature detector 60 in Embodiment 3 in that the temperature detector 60A transmits a signal indicating the temperature of the card slot 10 and a signal indicating the temperature of the printed wiring board 30 to the notifier 70. The temperature detector 60A is an example of the temperature detection means in an aspect of the present disclosure.

The notifier 70 receives, from the temperature detector 60A, the signal indicating the temperature of the card slot 10 and the signal indicating the temperature of the printed wiring board 30. When the temperature of the card slot 10 is higher than the temperature of the printed wiring board 30, the notifier 70 notifies the user that the contact switch 40, or a switch, is to be operated to place the card slot 10 and the heat transferrer 20 in contact with each other. When the temperature of the card slot 10 is lower than or equal to the temperature of the printed wiring board 30, the notifier 70 notifies the user that the contact switch 40, or the switch, is to be operated to place the card slot 10 and the heat transferrer 20 out of contact with each other. The notifier 70 is, for example, a display that can display information using images. The notifier 70 may notify the user that the card slot 10 and the heat transferrer 20 are to be placed in contact or out of contact with each other using, for example, a lamp or a buzzer. The notifier 70 is an example of notification means in an aspect of the present disclosure.

As described above, when the temperature of the card slot 10 is lower than or equal to the temperature of the printed wiring board 30, the notifier 70 notifies the user that the card slot 10 and the heat transferrer 20 are to be placed out of contact with each other. The user switches off the contact switch 40 based on the notification to prevent heat backflow from the printed wiring board 30 to the memory card 11. When the temperature of the card slot 10 is higher than the temperature of the printed wiring board 30, the notifier 70 notifies the user that the card slot 10 and the heat transferrer 20 are to be placed in contact with each other. The user switches on the contact switch 40 based on the notification to dissipate heat from the memory card 11 to the printed wiring board 30.

The electronic device 1 according to Embodiment 4 has been described. In the electronic device 1 according to Embodiment 4, the notifier 70 provides a notification to the user based on whether the temperature of the card slot 10 is higher or lower than the temperature of the printed wiring board 30. The user operates the contact switch 40 based on the notification to prevent heat backflow to the memory card 11. Although such a user operation is performed, the contact switch 40 may be simpler than in Embodiments 2 and 3.

Modifications

In each of the above embodiments, the printed wiring board 30 functions as a heat dissipator. However, any component other than the printed wiring board 30 may function as a heat dissipator. For example, the housing of the electronic device 1 may be used as a heat dissipator. In this case, the heat transferrer 20 is connected to the housing to transfer heat to the housing.

In Embodiment 2, the type of memory card 11 is associated with the transmission speed of the memory card 11. In addition, the type of memory card 11 may be associated with the capacity of the SD memory card, such as SD, Secure Digital High Capacity (SDHC), and Secure Digital eXtended Capacity (SDXC), associated with the shape of the SD memory card, such as SD, miniSD, and microSD, or associated with the standard of the SD memory card, such as SD, MultiMediaCard (MMC), and Secure Digital Input Output (SDIO).

When the type of memory card 11 is associated with the capacity, the memory card 11 having a larger capacity is expected to generate more heat. The contact switch 40A may thus be switched on when the capacity determined from the type is greater than or equal to a threshold. In other cases as well, the contact switch 40A may be designed to be switched on and off based on situations expected to cause more heat generation.

Figure 6:
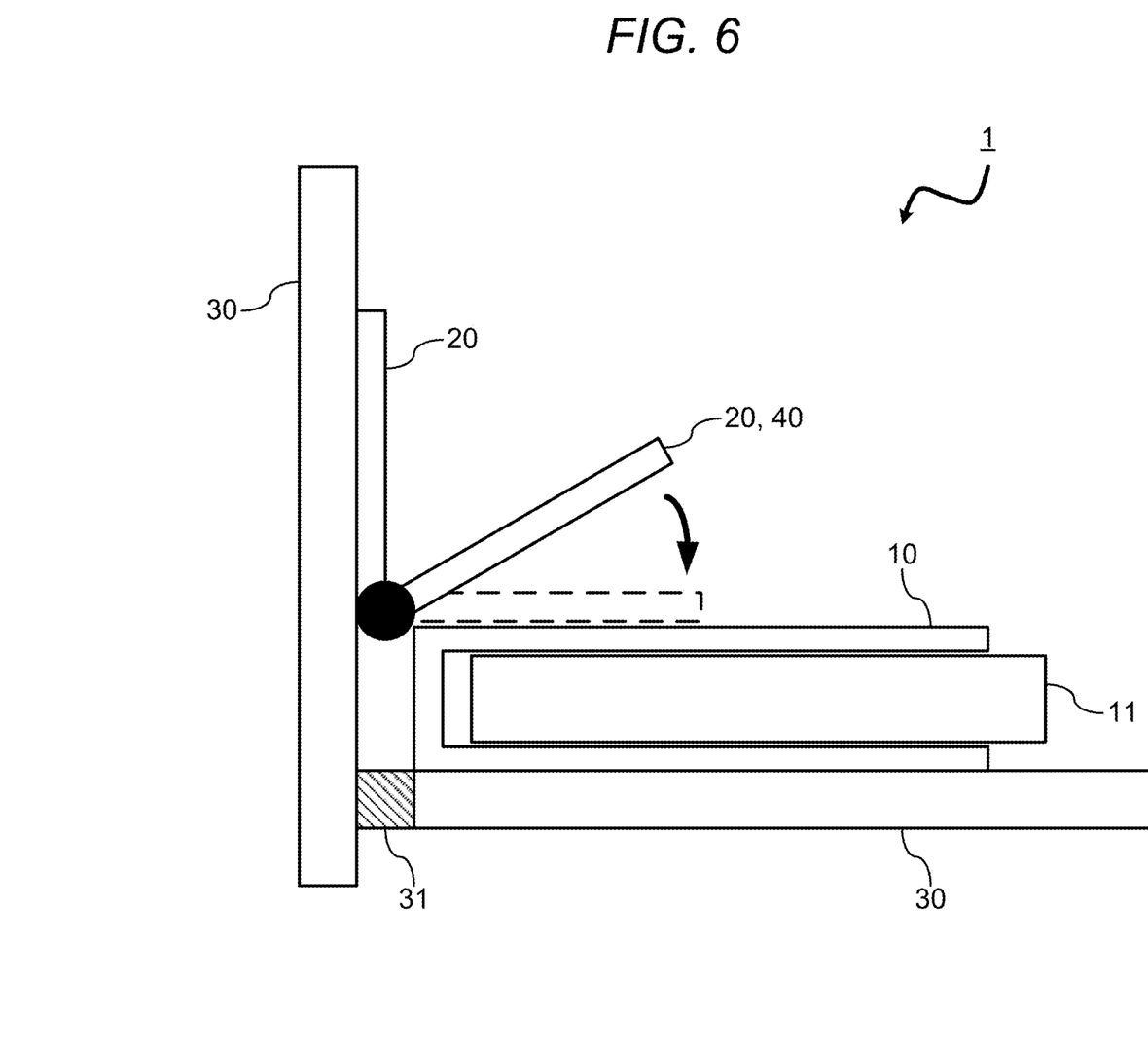
FIG. 6 is a schematic diagram of an electronic device according to a modification of Embodiment 1 of the present disclosure.

In Embodiment 1, when the contact switch 40 presses down the heat transferrer 20, the heat transferrer 20 comes in contact with the card slot 10. As illustrated in FIG. 6, for example, the electronic device 1 may include two printed wiring boards 30 arranged perpendicular to each other with a board connector 31 between the two printed wiring boards 30. In this case, two or more heat transferrers 20 may be connected in a hinge-like manner, and a pivotable portion of the heat transferrers 20 may come in contact with the card slot 10. In this case, the pivotable portion of the heat transferrers 20 pivots to switch between the contact state and the non-contact state with the card slot 10, and thus also functions as the contact switch 40.

Figure 7:
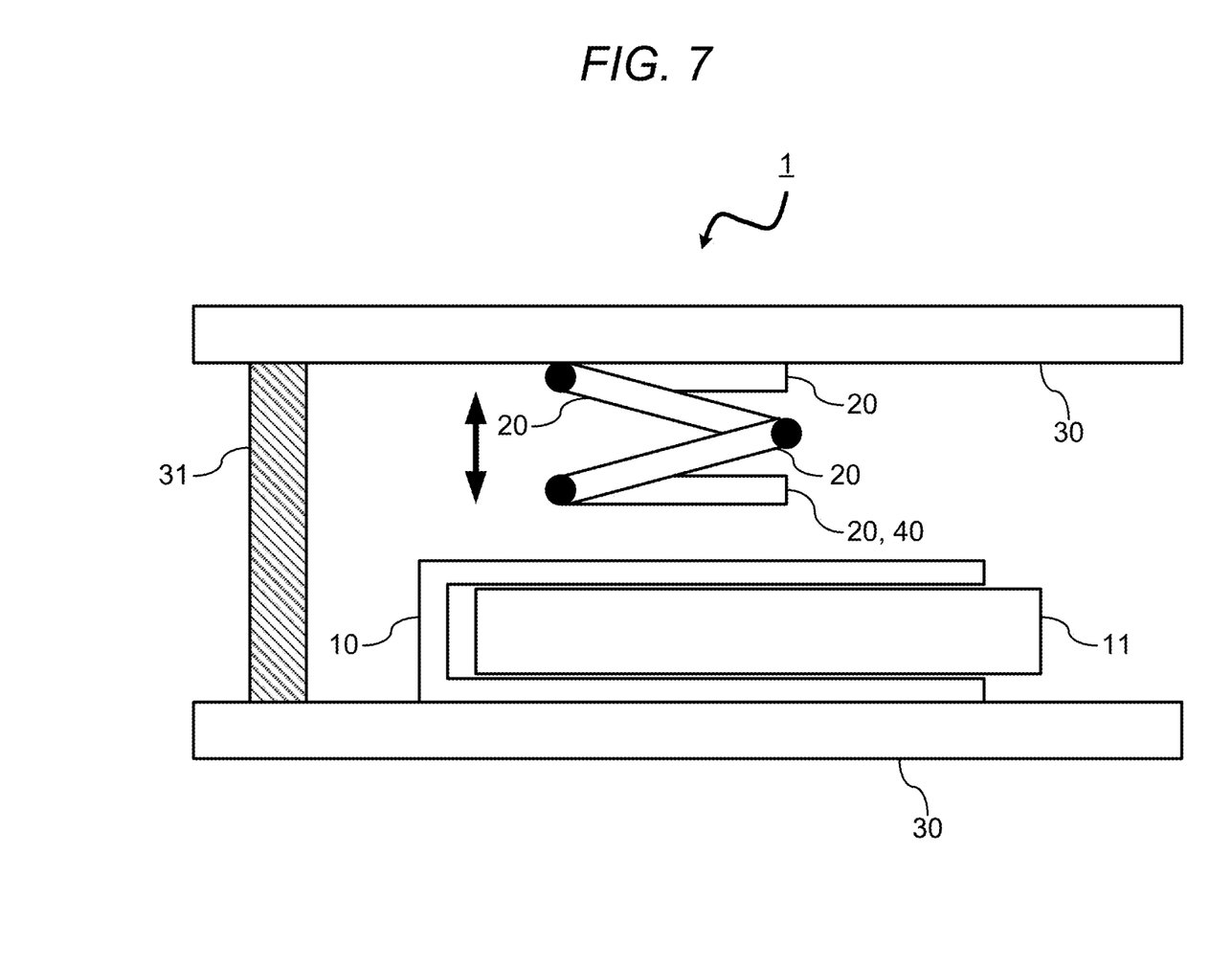
FIG. 7 is a schematic diagram of an electronic device according to a modification of Embodiment 1 of the present disclosure.

As illustrated in FIG. 7, for example, the electronic device 1 may include two printed wiring boards 30 parallel to each other with a board connector 31 between the two printed wiring boards 30. In this case, three or more heat transferrers 20 may be connected in a bellows-like manner to be extendable. A portion of the heat transferrers 20 closest to the card slot 10 may come in contact with the card slot 10. In this case, the portion of the heat transferrers 20 closest to the card slot 10 switches between the contact state and the non-contact state with the card slot 10, and thus also functions as the contact switch 40.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Electronic device
10 Card slot
11 Memory card
20 Heat transferrer
30 Printed wiring board
31 Board connector
40, 40A, 40B Contact switch
50 Type determiner
60, 60A Temperature detector
70 Notifier

The invention claimed is:

1. An electronic device, comprising:
a card slot;
a heat transferrer;
a heat dissipator connected to the heat transferrer to allow heat transfer from the heat transferrer;
temperature detector to detect a temperature of the card slot and a temperature of the heat dissipator; and
contact switch to switch between a contact state and a non-contact state of the card slot and the heat transferrer,
wherein the contact switch places the card slot and the heat transferrer in contact with each other when the temperature of the card slot is higher than the temperature of the heat dissipator, and places the card slot and the heat transferrer out of contact with each other when the temperature of the card slot is lower than or equal to the temperature of the heat dissipator.

2. The electronic device according to claim 1, wherein the card slot is configured to receive a Secure Digital (SD) card.

3. The electronic device according to claim 1, wherein the heat transferrer comprises a metal plate.

4. The electronic device according to claim 1, wherein the heat dissipator is a printed wiring board.

5. The electronic device according to claim 1, wherein the contact switch is operable by a user.

6. The electronic device according to claim 1, further comprising an indicator light that illuminates when the contact switch is in the contact state.

* * * * *